United States Patent [19]

Roberts

[11] Patent Number: 4,811,861
[45] Date of Patent: Mar. 14, 1989

[54] HOMOGENEOUSLY FUSION BONDED CARTRIDGES

[75] Inventor: John T. Roberts, Clover, S.C.

[73] Assignee: Poly Pro, Inc., Charlotte, N.C.

[21] Appl. No.: 45,223

[22] Filed: Apr. 29, 1987

Related U.S. Application Data

[63] Continuation of Ser. No. 733,090, May 13, 1985, abandoned, Continuation-in-part of Ser. No. 421,859, Sep. 23, 1982, abandoned.

[51] Int. Cl.$^4$ ............................................. B65H 3/24
[52] U.S. Cl. .................................... 221/197; 221/268; 227/120; 206/344; 156/308.4; 156/344
[58] Field of Search ..................... 221/25–26, 221/30, 197, 239, 268, 312 C, 281; 156/344, 308.4, 290; 227/120; 206/343–346

[56] References Cited

U.S. PATENT DOCUMENTS

| | | | |
|---|---|---|---|
| 230,632 | 8/1880 | Hubbard | 206/343 |
| 2,511,845 | 6/1950 | Gumbel | 221/268 X |
| 3,330,058 | 7/1967 | Lefever | 227/120 X |
| 3,526,337 | 9/1970 | Paxton | 221/26 |
| 3,560,290 | 2/1971 | Sendor et al. | 156/308.4 X |
| 4,232,068 | 11/1980 | Hoh et al. | 428/43 |

Primary Examiner—Charles A. Marmor
Attorney, Agent, or Firm—Bailey & Hardaway

[57] ABSTRACT

A dispensing cartridge comprising a plurality of stacked individual articles formed of rigid or semi-rigid thermoplastic material, each article being fusion bonded at its periphery to adjacent articles in the stacked relationship. The cartridges are formed by passing a stack of the articles through a heating zone to fusion bond the articles one to the other without producing any visual discontinuity about the periphery of the cartridge.

3 Claims, 3 Drawing Sheets

HOMOGENEOUSLY FUSION BONDED CARTRIDGES

This application is a continuation of application Ser. No. 733,090, filed May 13, 1985, now abandoned, which is a continuation-in-part of application Ser. No. 421,859, filed Sept. 23, 1982, now abandoned.

BACKGROUND OF THE INVENTION

This invention relates generally to the art of dispensing, and more particularly to a novel dispensing cartridge for thermoplastic articles as well as the formation of such cartridge.

The dispensing of articles in automatic fashion has been of significant interest in the transition from manual processing to machine processing of various items. Dispensing techniques have been particularly well developed in the area of packaging. Examples of such technology include the automatic dispensing of plastic bags, one at a time, by having such bags arranged in a shingled relationship along a taped carrier. Additionally, such bags have been shingled to one another utilizing heat seals between individual bags. The overall object of such an arrangement is to facilitate the dispensing of such bags utilizing automated equiment.

Associated with such technology and the packaging art are various items of rigid plastic material which must be dispensed one at a time in order to have some association with a bag or packaged article.

One such device is described in U.S. Pat. No. 3,270,874 to Hilton, where individual plastic bag closures such as the type normally used on bread packages are arranged together in a unitary, side-by-side relationship with scores between individual articles from the unitary strip. Such articles are severed by merely bending the strip at the point of score. This product is arranged primarily for manual dispensing.

A dispensing mechanism is described in U.S. Pat. No. 2,939,147 to Jacobson, wherein curtain hooks are arranged for automatic dispensing, one at a time, such that the clips are stacked together and connected together by a spline which maintains the hooks in the stacked relationship, and facilitates loading into a magazine where they are dispensed one at a time from the stack.

Another dispensing device is described in U.S. Pat. No. 3,165,968 to Anstett wherein a plastic nailing strip is utilized to connect together individual nail articles for the purpose of dispensing the articles one at a time with automated equipment. A similar device is described in U.S. Pat. No. 3,357,761 to Lagas et al.

In facilitating the marketing of retail items, it has been known in the prior art to utilize rigid thermoplastic hooks or hanger attachments to individual articles for displaying such articles in a retail environment. In the past such hooks have been dispensed from a loose cartridge for stapling or other means of attachment to a marketable item. Such individual hooks have been arranged within magazines manually in loose stacks. Such arrangement has required great skill on the part of the operator in order to assure loading of large numbers of such hooks in a stacked relationship. Essentially, such loading requires movement of large numbers of hooks within a stack by utilizing only hand pressure at both ends to maintain the stack in alignment, while hoping that the central area of the stack did not collapse to produce a disoriented array of hooks which must be again manually restacked for purposes of loading into a dispensing magazine.

SUMMARY OF THE INVENTION

It is thus an object of this invention to provide a novel cartridge of thermoplastic articles for dispensing purposes.

It is a further object of this invention to provide a cartridge of individual thermoplastic articles for use within a dispensing magazine without the use of extraneous attachment material.

It is still further and more particular object of this invention to provide such a cartridge which is not subject to operator skill in the loading of such cartridge into a magazine.

It is a still further and more particular object of this invention to provide such a cartridge with uniform bonding about the perimeter of such cartridge.

These, as well as other objects, are accomplished by a dispensing cartridge for use in dispensing thermoplastic articles in seriatim fashion. The cartridge comprises a plurality of stacked individual articles formed of rigid or semi-rigid thermoplastic material, each article being fusion bonded at its periphery to adjacent articles in the stacked relationship. The cartridges are formed by passing a stack of the articles through a heating zone to fusion bond the articles one to the other without producing any visual discontinuity about the periphery of the cartridge.

DETAILED DESCRIPTION

In accordance with this invention it has been found that a group of individual thermoplastic articles may be arranged in a stacked relationship for seriatim dispensing thereof. The articles are formed into a generally connected cartridge by a fusion bond between individual thermoplastic articles. The article in accordance with this invention is thus essentially unified and fixed so as to facilitate movement and the loading thereof without any disarray created in the relationship by operator skill. Additionally, the individual articles are readily sheared from the cartridge without leaving behind extraneous matter to foul the dispensing mechanism or work area. Various advantages and features of the invention will be apparent from the following description given with reference to the various figures of drawing.

Figure 1:
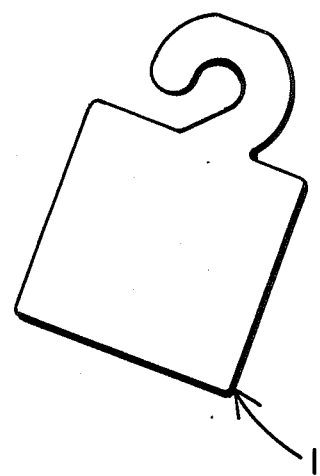
FIG. 1 illustrates a thermoplastic article in accordance with this invention.

FIG. 1 of the drawings illustrates an individual thermoplastic article 1, which in this instance is a flat thermoplastic hook for use in the display and marketing of retail items.

Figure 2:
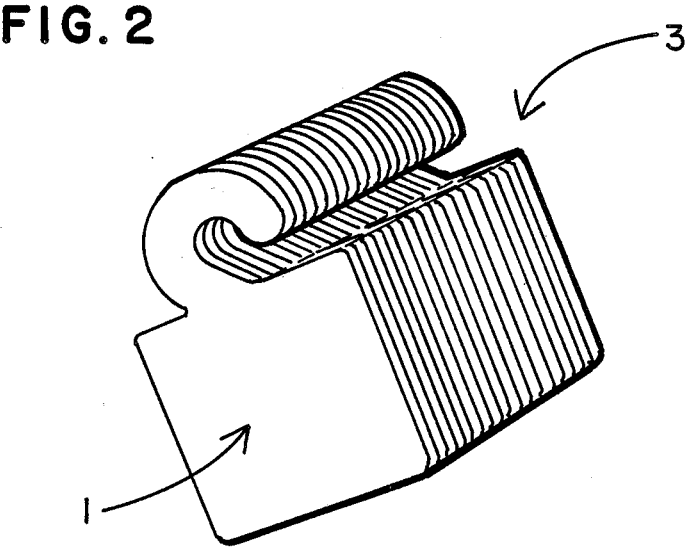
FIG. 2 of the drawing illustrates the thermoplastic article of FIG. 1 formed into a cartridge in accordance with this invention.

FIG. 2 of the drawings illustrates the individual thermoplastic article 1, arranged into a cartridge 3, for utilization within a magazine of a dispensing apparatus.

It is seen from FIG. 2 of the drawings that the cartridge 3 is formed without any visual discontinuity along the edge of the thermoplastic articles. The cartridge is formed by a stacked relationship of individual thermoplastic article 1 such that the individual thermoplastic articles may be sheared from the cartridge in seriatim fashion.

Figure 3:
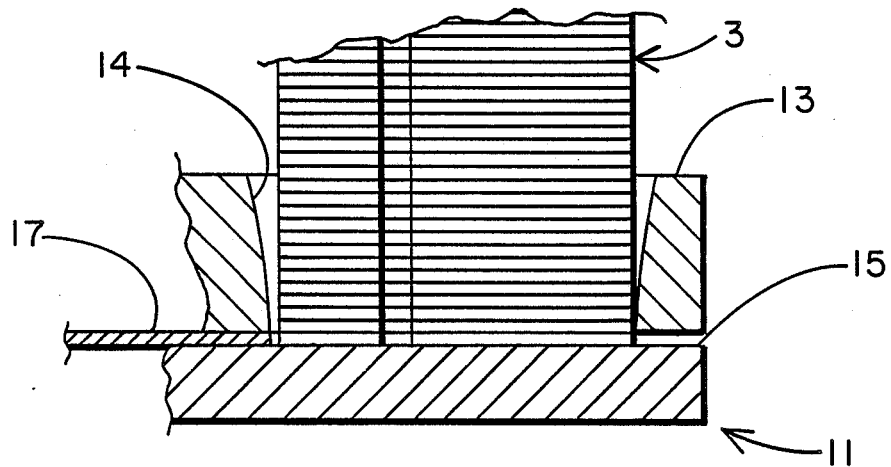
FIGS. 3 and 4 illustrate the dispensing of an individual thermoplastic article from the cartridge illustrated in FIG. 2 of the drawings.

FIG. 3 of the drawings illustrates a dispensing mechanism 11, which comprises means defining a magazine 13, a surface 15 upon which cartridge 3 rests, and a shear blade 17 for shearing individual thermoplastic articles 1 from cartridge 3.

Figure 4:
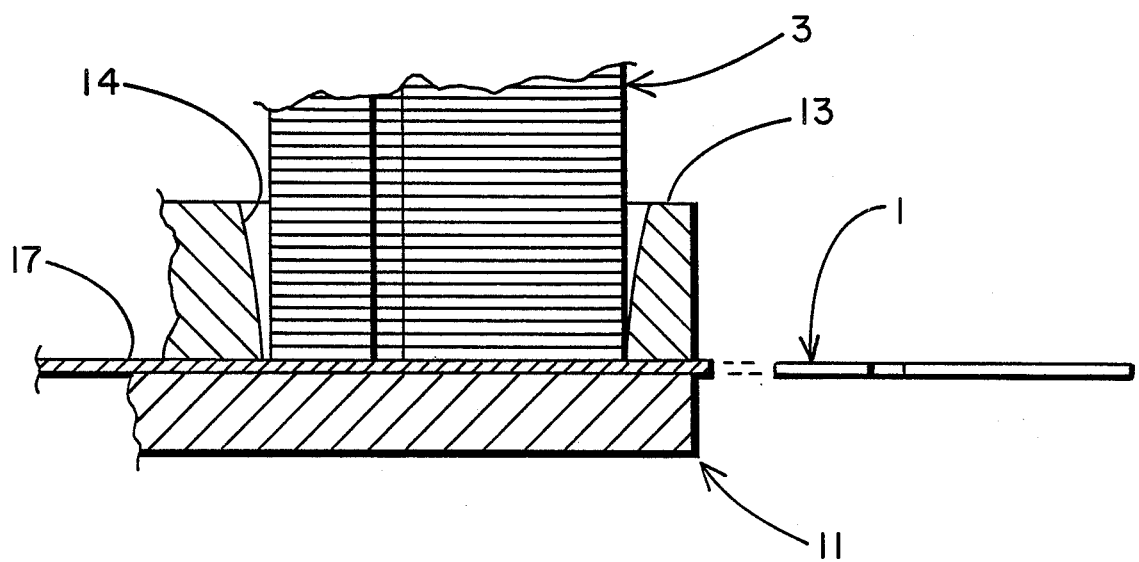

FIG. 4 of the drawings illustrates the apparatus of FIG. 3 with shear blade 17 having severed an individual article 1 from cartridge 3. It is seen that the cartridge 3 may be readily loaded into magazine 13 without great effort required on the part of the operator. The disarray of a card house effect utilizing the cartridge of this invention since the fusion bond 5 maintains the array in a unitary form without adding extraneous matter to the cartridge. The absence of extraneous bonding material eliminates the need for disposing of scrap matter once dispensing has occurred.

A novel aspect of the dispensing process in accordance with this invention is utilizing a magazine 13 formed of tapering walls 14. An unexpected advantage of utilizing tapered walls 14 has been the accommodation of discrepancies in thickness from one individual article to the other, particularly discrepancies in individual articles from one side thereof to the other.

By utilizing tapered walls each individual article is allowed to rest flushly upon surface 15. If, on the other hand, the cartridge were contained by rigid walls an individual bottom article may be somewhat skewed and perhaps not be perfectly sheared by blade 17.

The dispensing cartridge in accordance with this invention may be formed from individual articles of any thermoplastic materials which are capable of being fusion bonded together. The more prominently useful thermoplastic materials currently utilized for commercial applications include the polyolefins and copolymers of olefins with polyethylene, polyprophylene and copolymers of ethylene and propylene with ethylene vinyl acetate being extensively utilized material because of the low cost thereof. This invention is, however, applicable to virtually any article formed from a rigid or semirigid thermoplastic material. Cartridges of the type illustrated in FIG. 2 of the drawings may be formed utilizing literally hundreds of individual thermoplastic articles which is significantly more than any skilled operator could manually handle in one loading operation. The increased operator efficiency brought about by utilization of this invention is surprising and unexpected.

As previously indicated, the key feature of this invention is a fusion bond about the periphery of the individual article 1 so as to form a cartridge 3 with no visual discontinuities about the periphery of the cartridge 3.

Figure 5:
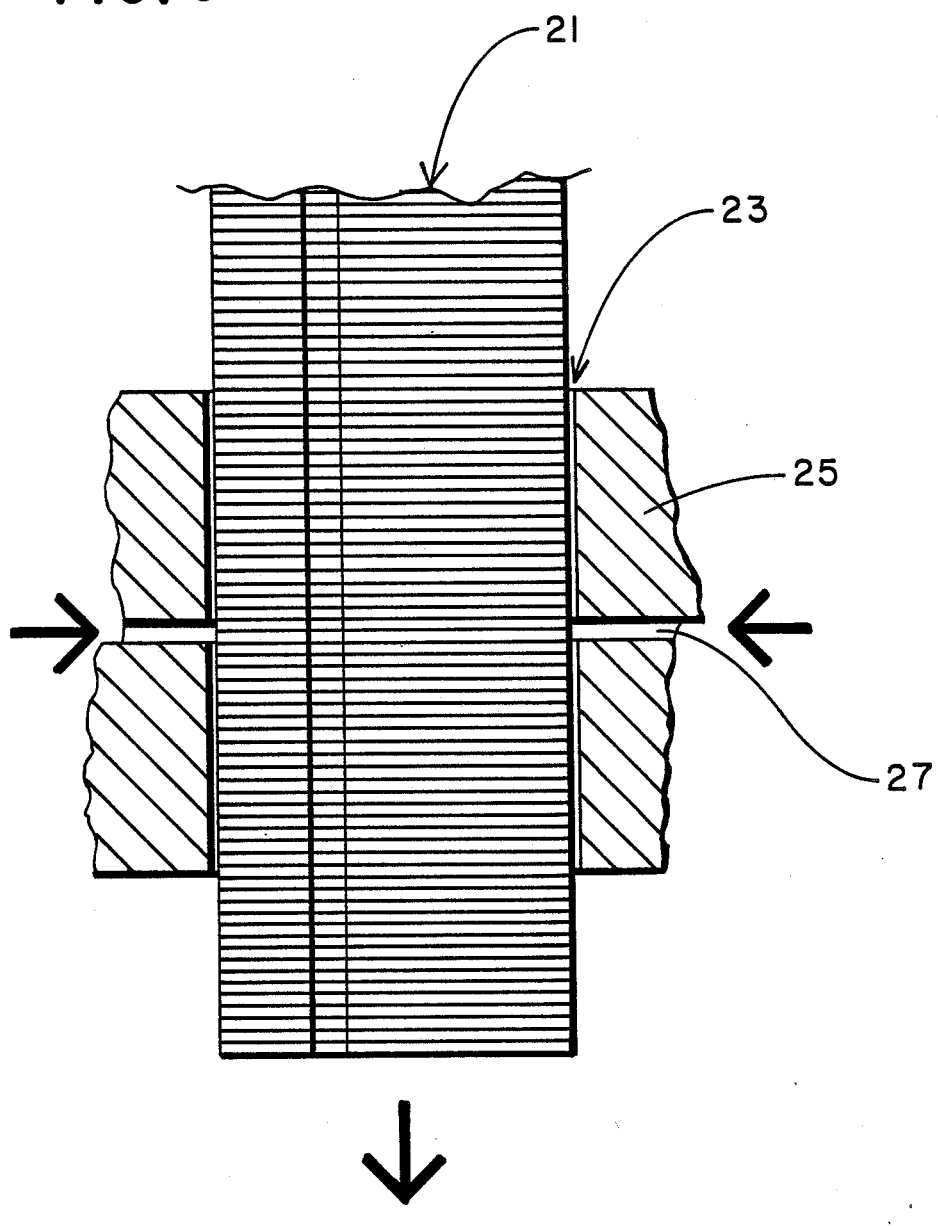
FIG. 5 of the drawings schematically illustrates a process of forming a cartridge in accordance with this invention.

FIG. 5 of the drawings illustrates a preferred process of forming such a bond. Illustrated in FIG. 5 of the drawings is a stack of individual articles 21 moving vertically downwardly through heating chamber 23 defined by containment means 25.

It is seen that the chamber 23 extends vertically for a number of layers of the individual articles 1. Chamber 23 communicates with a source of heated air 27 so that heated air flows within chamber 23 between the bounds thereof and the edges of the stack 21 of individual article 1. The temperature of the air flowing through chamber 23 is carefully controlled so as to be within the softening range of the thermoplastic material involved. The thermoplastic articles are moved through the zone at a speed sufficient to permit bonding about the periphery but without significant other bonding occurring. The time and temperature parameters would, of course, vary for various types of materials and thicknesses and contours of the individual articles 1. For polyethylene at a thickness of one tenth of an inch it has been found sufficient to pass stacks through a chamber at a temperature of 400 degrees Fahrenheit for approximately 0.05 seconds exposure in order to form a cartridge suitably bonded.

As an alternative to the utilization of a flow of heated air, other heating means such as radiant heat may be utilized. Additionally, walls of chamber defining means 25 may be heated so as to provide a radiant heat source to fusion bond edges of individual articles 1.

A preferred process for forming cartridge in accordance with this invention is to stamp individual thermoplastic articles from a sheet of rigid or semi-rigid material. The stamped item is then immediately moved directly into chamber 23 located beneath the stamping die.

The stamped item is thus loaded directly into chamber 23 so that no disorientation occurs between individual articles during the forming process. The fusion heat seal is thus immediately effected while the individual articles are still within close association to the stamping die.

Complete cartridges in accordance with this invention thus may be unloaded from chamber 23. It is understood that that beneath chamber 23 support mechanisms are provided such as edge engaging wheels to support the stack 21 of individual articles during the fusion process with removal of cartridge segments occurring below the support means. Complete cartridges in accordance with this invention may thus be unloaded from the chamber 23 and shipped to remote locations for utilization on automated equipment.

While the above preferred embodiment discusses individual articles which may be stamped from sheet material, it is understood that other techniques of formation such as injection molding may be utilized to form individual articles.

It is thus apparent that the invention disclosed herein provides a cartridge of individual thermoplastic articles attached together without extraneous material thus facilitating the loading of dispensing magazines without requiring extensive operator skill, and permitting the loading of significantly greater numbers of individual articles than could heretofore be carried out by human operator. The invention additionally provides a cartridge without the appearance of any visual discontinuities about the periphery thereof. The invention also provides a novel process for the formation of such articles. As many variations will become apparent from a reading of the above description, such variations are embodied within the spirit and scope of the invention as defined by the following appended claims.

What is claimed is:

1. A dispensing cartridge for use in dispensing individual thermoplastic articles from the cartridge in seriatim order, said cartridge comprising a plurality of stacked individual thermoplastic articles, each said article having a generally planar interface between adjacent stacked articles and being formed of rigid or semirigid thermoplastic material, each said article being fusion bonded about its periphery to adjacent articles in the stacked relationship, the peripheral surface of said cartridge being generally continuous with said fusion bond causing no discontinuity therein produced by melting and with each said article being capable of being non-destructively sheared and separated from an end of said cartridge along said planar interface.

2. The cartridge according to claim 1 wherein said fusion bond extends substantially uniformly about the periphery of each article.

3. The cartridge according to claim 1 wherein each of said articles is in the shape of a hook.

* * * * *